US010109032B2

(12) United States Patent
Brasnett et al.

(10) Patent No.: US 10,109,032 B2
(45) Date of Patent: Oct. 23, 2018

(54) PIXEL BUFFERING

(71) Applicant: Imagination Technologies Limited, Kings Langley (GB)

(72) Inventors: Paul Brasnett, Kings Langley (GB); Jonathan Diggins, Chesham (GB); Steven Fishwick, Kings Langley (GB); Stephen Morphet, St. Albans (GB)

(73) Assignee: Imagination Technologies Limted, Kings Langley (GB)

( * ) Notice: Subject to any disclaimer, the term of this patent is extended or adjusted under 35 U.S.C. 154(b) by 1377 days.

(21) Appl. No.: 13/798,934

(22) Filed: Mar. 13, 2013

(65) Prior Publication Data

US 2014/0063031 A1    Mar. 6, 2014

(30) Foreign Application Priority Data

Sep. 5, 2012   (GB) .................................... 1215870.5

(51) Int. Cl.
*H04N 19/33* (2014.01)
*G06T 1/60* (2006.01)
(Continued)

(52) U.S. Cl.
CPC .............. *G06T 1/60* (2013.01); *G06T 3/0025* (2013.01); *H04N 19/33* (2014.11); *H04N 19/428* (2014.11)

(58) Field of Classification Search
CPC ........................... H04N 19/139; H04N 19/433
See application file for complete search history.

(56) References Cited

U.S. PATENT DOCUMENTS 5,142,616 A * 8/1992 Kellas et al. .................. 345/634
5,418,570 A * 5/1995 Ueno et al. .............. 375/240.14
(Continued)

FOREIGN PATENT DOCUMENTS

CN          1445981 A      10/2003
CN        101025912 A       8/2007
(Continued)

OTHER PUBLICATIONS

Memory Centric video processing, Aleksandar Beric, IEEE Transactions on Circuitsa and Systems for Video Technology, Apr. 2008.*
(Continued)

*Primary Examiner* — Jayanti K Patel
*Assistant Examiner* — Shadan E Haghani
(74) *Attorney, Agent, or Firm* — Vorys, Sater, Seymour and Pease LLP; Vincent M DeLuca

(57) ABSTRACT

In an example method and system, image data to an image processing module. Image data is read from memory into a down-scaler, which down-scales the image data to a first resolution, which is stored in a first buffer. A region of image data which the image processing module will request is predicted, and image data corresponding to at least part of the predicted region of image data is stored in a first buffer, in a second resolution, higher than the first. When a request for image data is received, it is then determined whether image data corresponding to the requested image data is in the second buffer, and if so, then image data is provided to the image processing module from the second buffer. If not, then image data from the first buffer is up-scaled, and the up-scaled image data is provided to the image processing module.

54 Claims, 10 Drawing Sheets

(51) Int. Cl.
*G06T 3/00* (2006.01)
*H04N 19/426* (2014.01)

(56) References Cited

U.S. PATENT DOCUMENTS

| | | | |
|---|---|---|---|
| 5,784,114 A | 7/1998 | Borer et al. | |
| 5,805,222 A * | 9/1998 | Nakagawa et al. | 375/240.12 |
| 5,861,920 A * | 1/1999 | Mead et al. | 375/240.25 |
| 5,929,919 A | 7/1999 | De Haan et al. | |
| 6,057,849 A * | 5/2000 | Haubner et al. | 345/428 |
| 6,078,617 A * | 6/2000 | Nakagawa et al. | 375/240 |
| 6,618,443 B1 * | 9/2003 | Kim | G06T 3/4084 |
| | | | 348/E7.016 |
| 8,014,618 B2 | 9/2011 | Kyung et al. | |
| 8,325,798 B1 * | 12/2012 | Cismas | H04N 19/573 |
| | | | 345/536 |
| 2002/0196853 A1 * | 12/2002 | Liang | H04N 19/61 |
| | | | 375/240.16 |
| 2003/0103568 A1 * | 6/2003 | Lee et al. | 375/240.16 |
| 2003/0169263 A1 * | 9/2003 | Lavelle | G09G 5/39 |
| | | | 345/531 |
| 2005/0213833 A1 * | 9/2005 | Okada et al. | 382/240 |
| 2006/0008154 A1 * | 1/2006 | Belle | 382/232 |
| 2007/0071104 A1 * | 3/2007 | Kondo | 375/240.21 |
| 2007/0230564 A1 * | 10/2007 | Chen et al. | 375/240.01 |
| 2008/0285652 A1 * | 11/2008 | Oxman et al. | 375/240.16 |
| 2008/0309778 A1 * | 12/2008 | Tabatabai | H04N 5/2258 |
| | | | 348/222.1 |
| 2009/0175343 A1 * | 7/2009 | Pearlstein | H04N 19/105 |
| | | | 375/240.16 |
| 2010/0215104 A1 * | 8/2010 | Osamoto | H04N 5/23254 |
| | | | 375/240.16 |
| 2010/0271554 A1 * | 10/2010 | Blume | G06T 7/2033 |
| | | | 348/699 |
| 2010/0316127 A1 | 12/2010 | Yokoyama | |
| 2012/0195376 A1 * | 8/2012 | Wu | H04N 19/105 |
| | | | 375/240.12 |
| 2013/0236163 A1 * | 9/2013 | Hellman | H04N 19/186 |
| | | | 386/326 |

FOREIGN PATENT DOCUMENTS

| | | |
|---|---|---|
| CN | 101924873 A | 12/2010 |
| JP | 2010171480 A | 8/2010 |
| JP | 2010288110 A | 12/2010 |

OTHER PUBLICATIONS

Combined Search and Exam Report in GB1215870.5, dated Feb. 22, 2013.

Beric, Aleksandar, "Memory-Centric Video Processing", IEEE Transactions on Circuits and Systems for Video Technology, vol. 18, No. 4, (Apr. 1, 2008), 439-452.

German Application Serial No. 102013013636.9, Office Action dated Oct. 22, 2014, With English Translation, 9 pgs.

Huang, Ai-Mei, "Correlation-Based Motion Vector Processing With Adaptive Interpolation Scheme for Motion-Compensated Frame Interpolation ", IEEE Transactions on Image Processing, vol. 18, No. 4, (Apr. 1, 2009), 740-752.

Luessi, Martin, "Efficient Motion Compensated Frame Rate Upconversion Using Multiple Interpolations and Median Filtering'", ICIP, (Jan. 1, 2009), 373-376.

Ojo, Olukayode Anthony, "Robust Motion-Compensated Video Upconversion ", IEEE Transactions on Consumer Electronics, vol. 43, No. 4, (Nov. 1, 1997), 1045-1056.

* cited by examiner

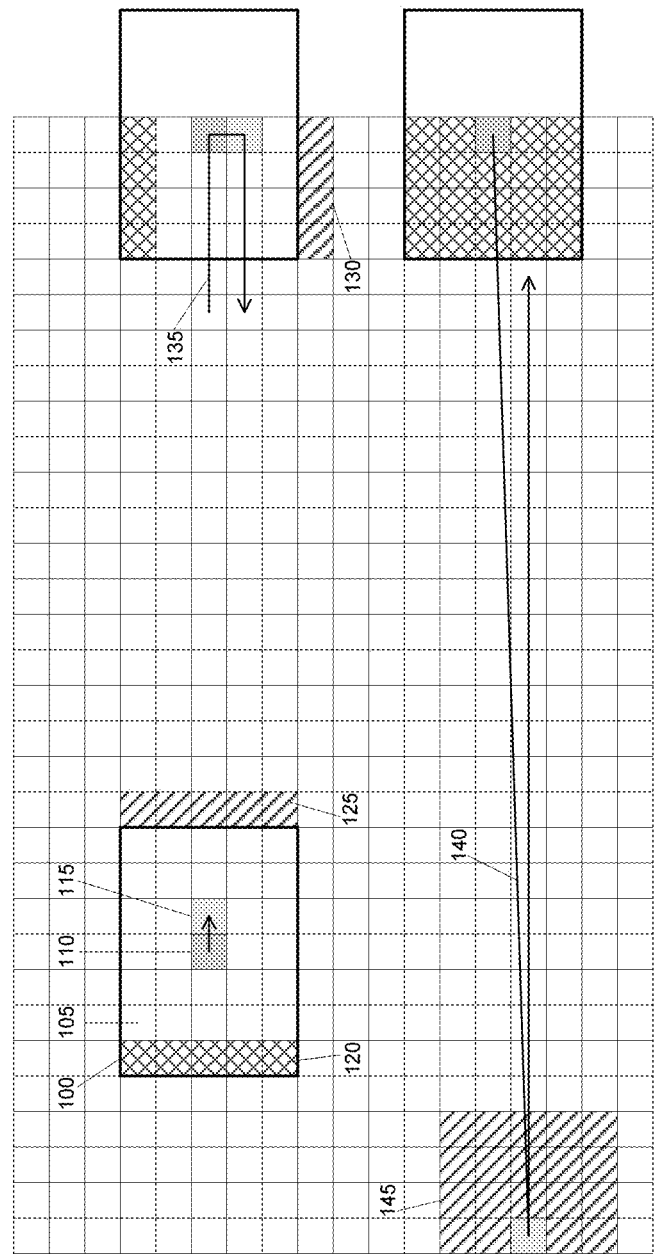
Figure 1 -
Narrow pixel
data buffer

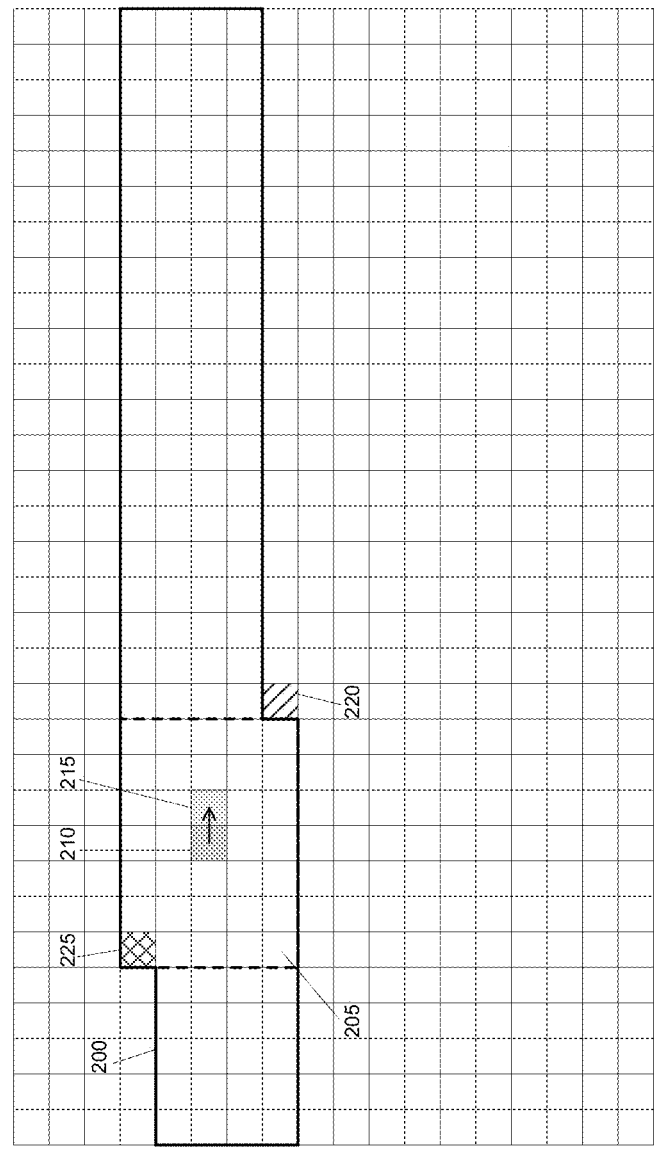
Figure 2 - Wide pixel data buffer

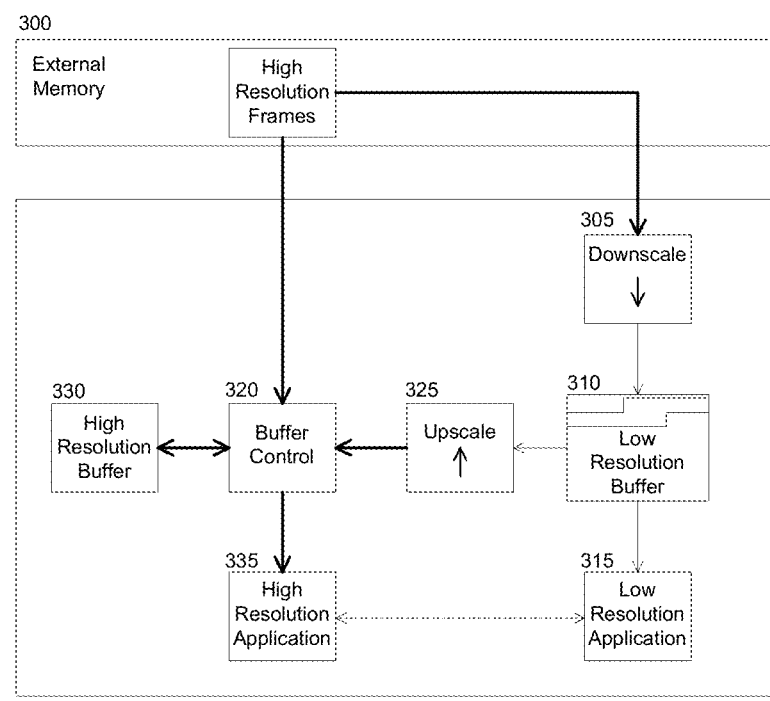
Figure 3 - System Block Diagram

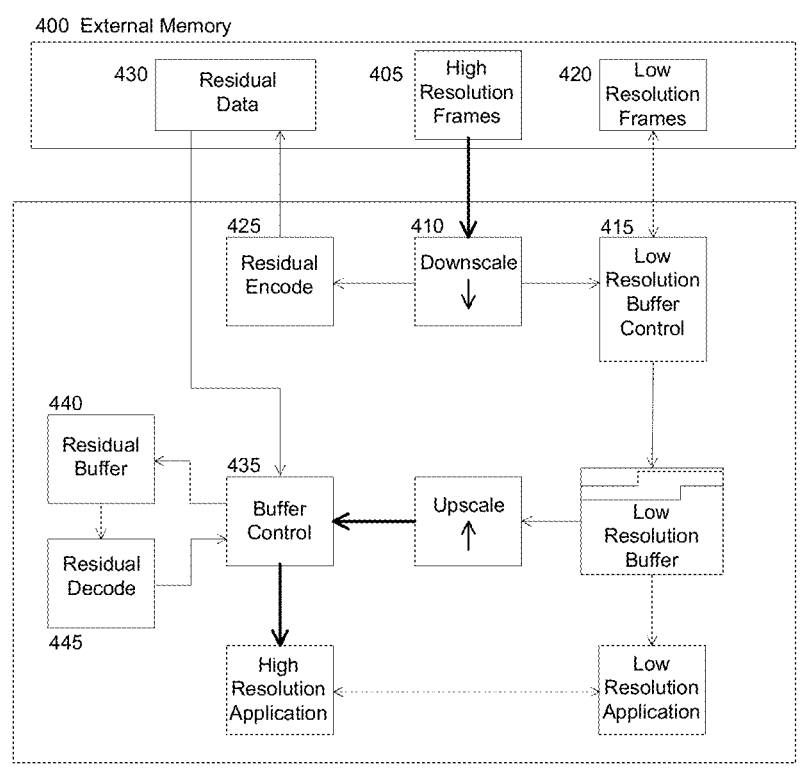
Figure 4 - Enhanced System Block Diagram

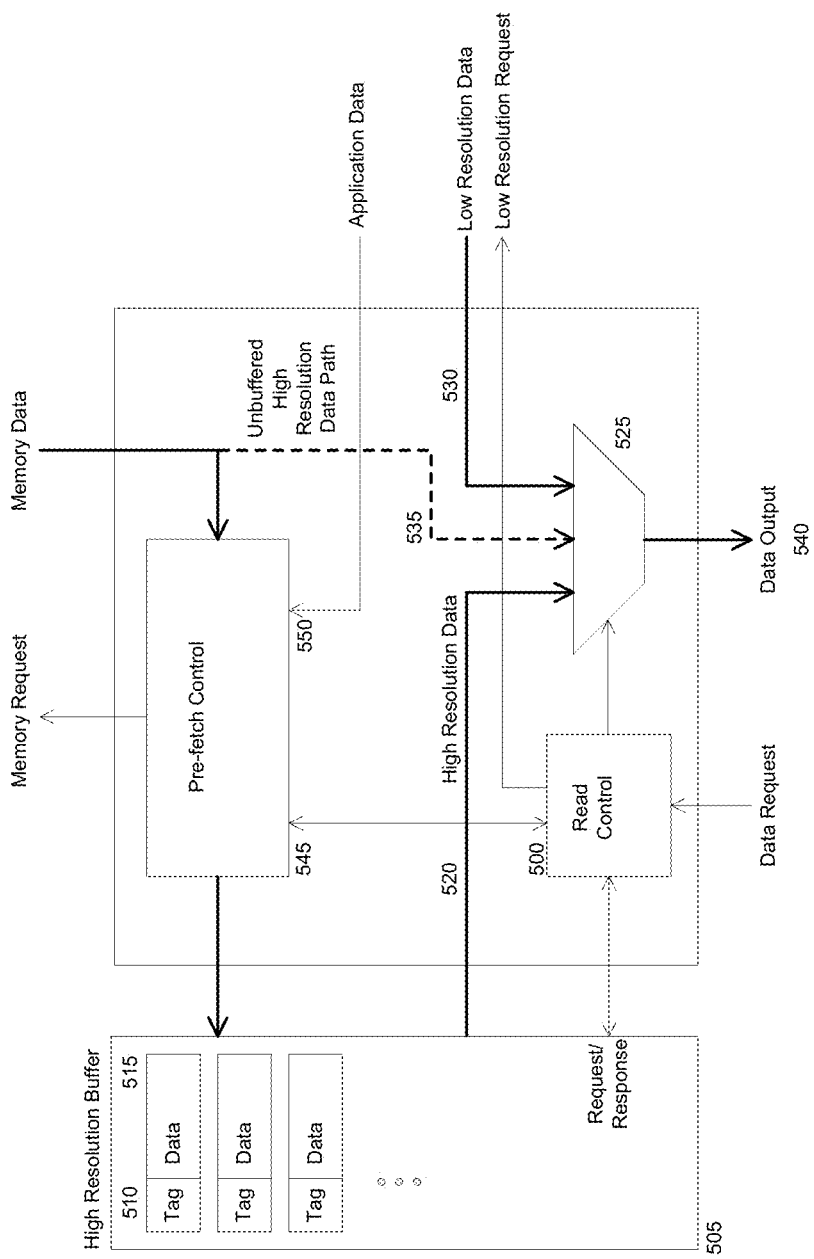
Figure 5 - Buffer Control Unit

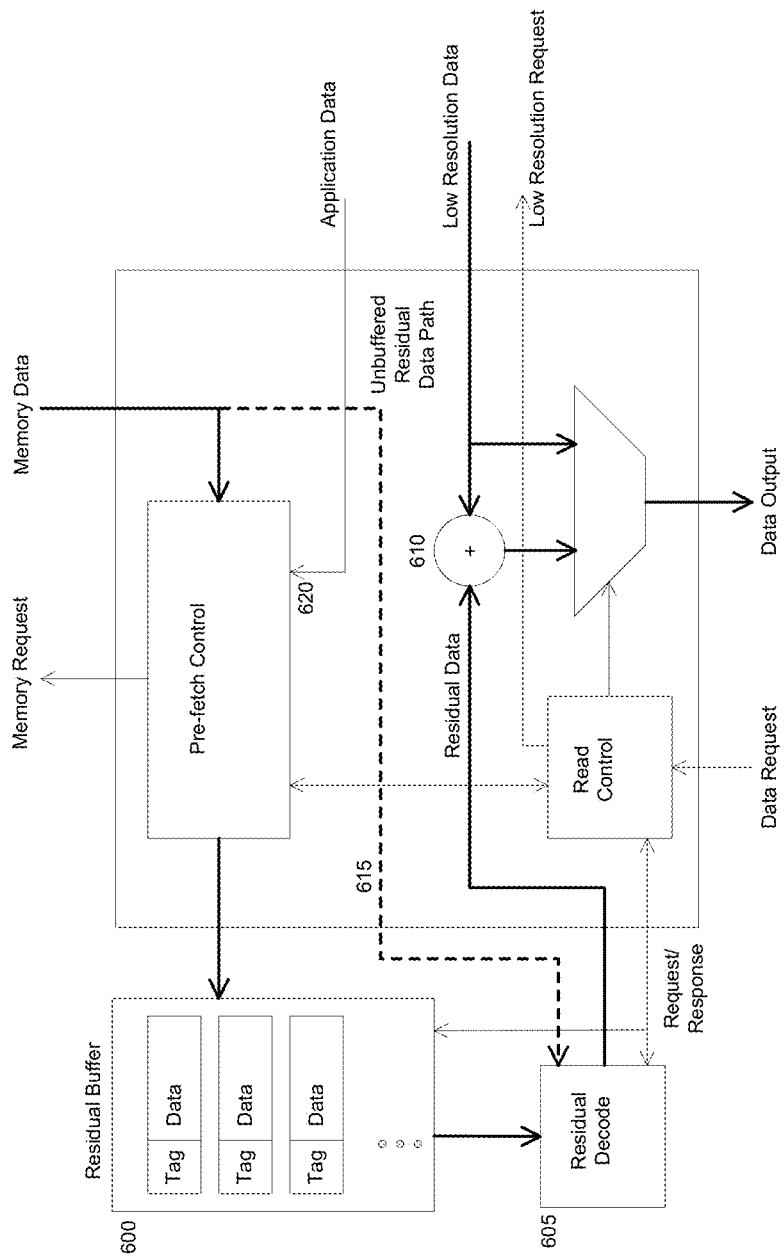
Figure 6 - Buffer Control Unit with Residual Data

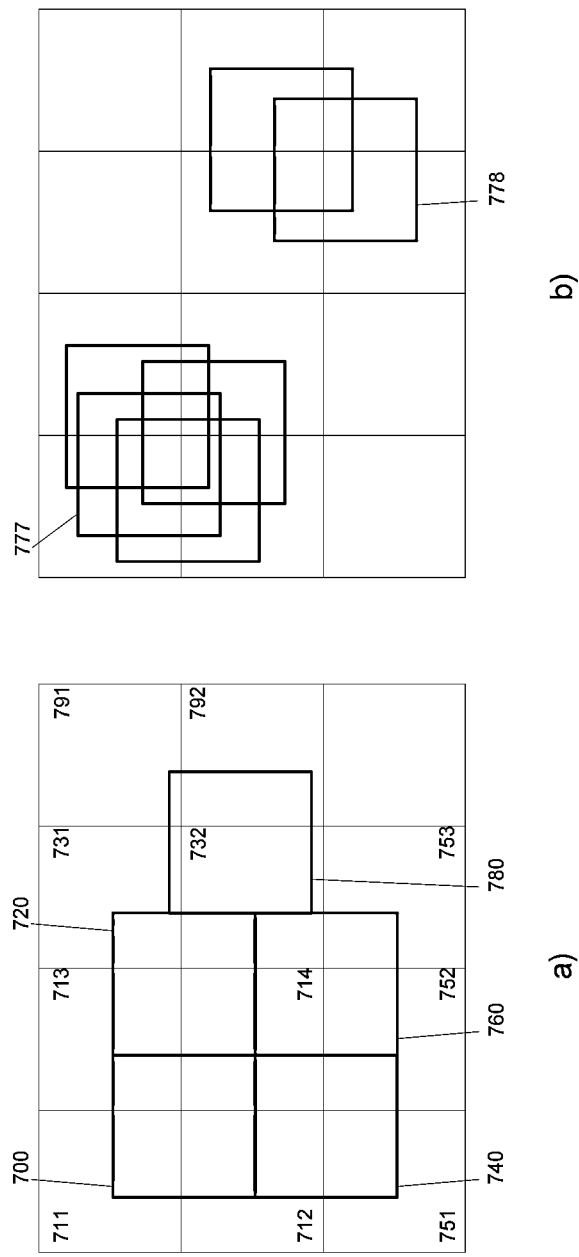
Figure 7 - Alignment of Data Requests

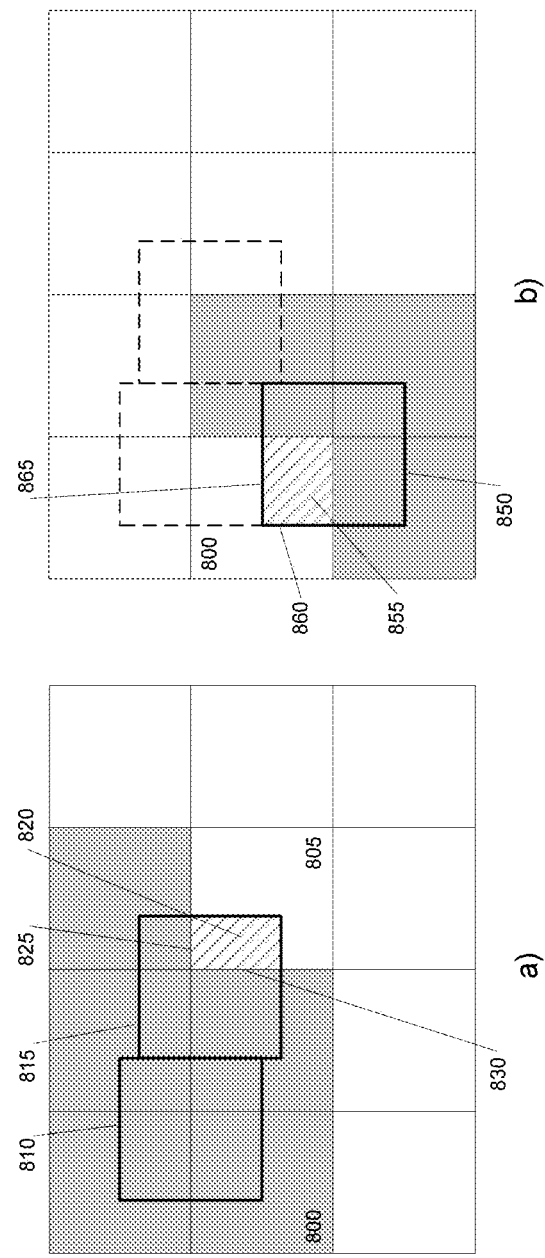
Figure 8 - Availability of Data

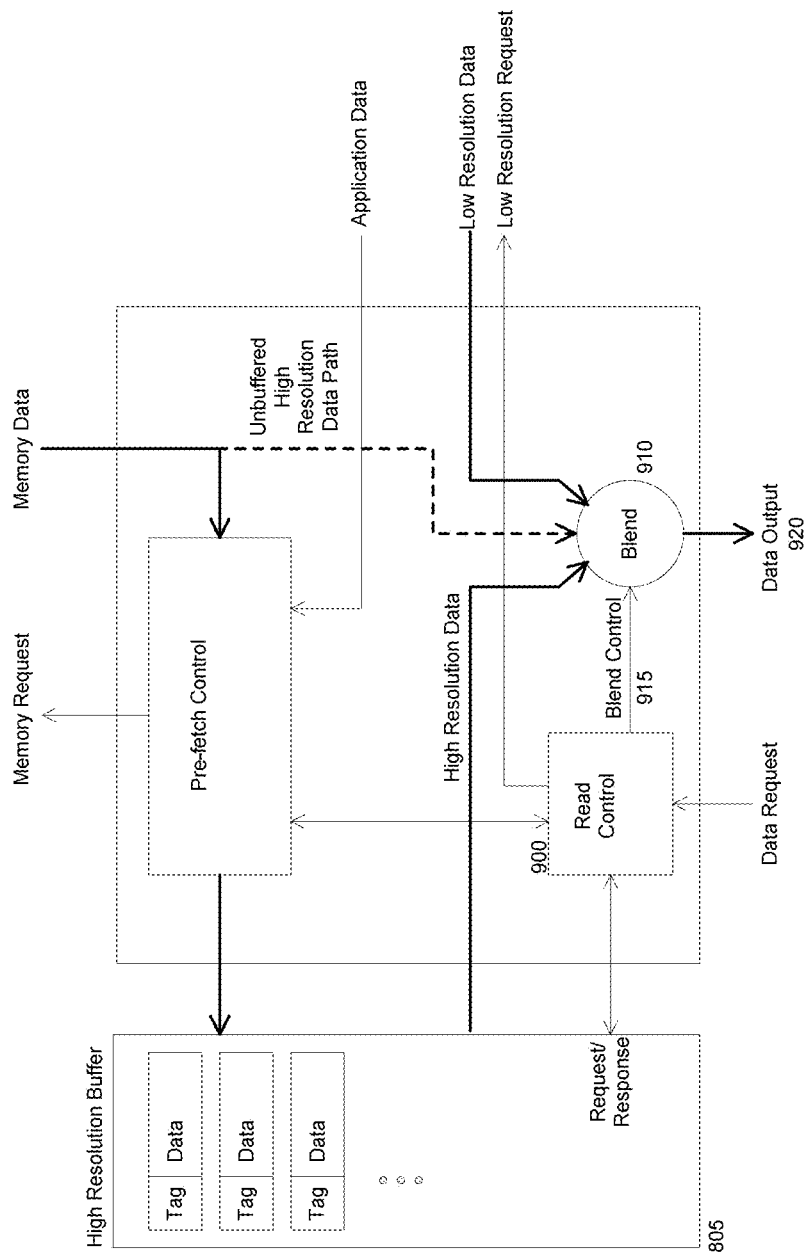
Figure 9 - Buffer Control Unit with Blending

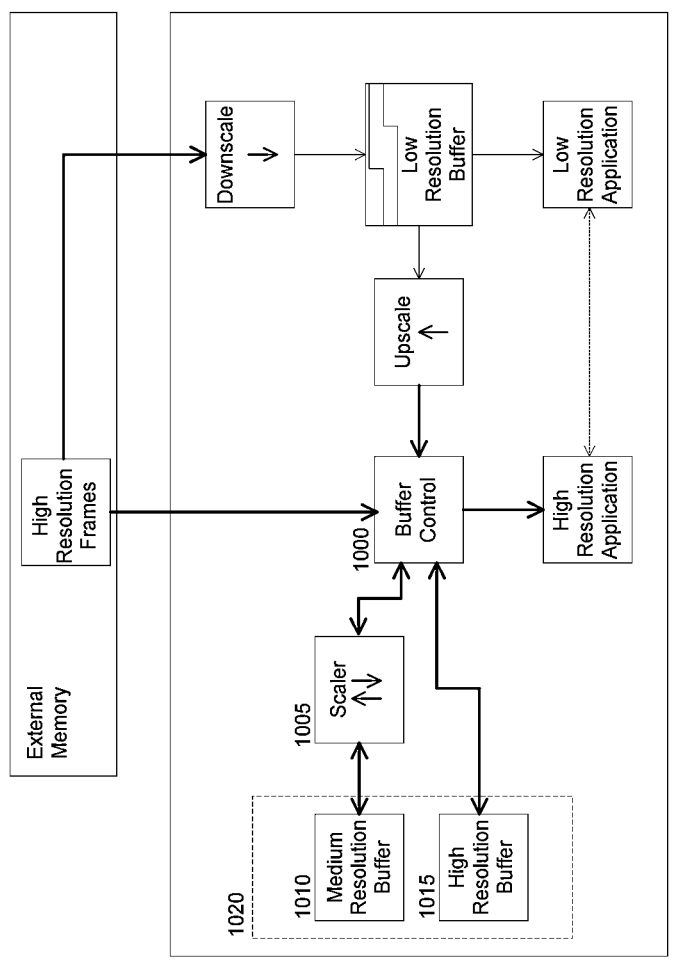

PIXEL BUFFERING

Some aspects relate to a method and system for providing image data to an image processing module.

BACKGROUND

Image or video processing systems can place heavy demands on memory systems. An image processing device is typically connected to a memory using a bus with a finite bandwidth. In many cases there will also be memory local to the image processing device, operating as a buffer or cache, which aims to reduce the amount of data being read from or written to the memory via the bus. Reading data from memory via a bus is relatively slow, and consumes more power, compared to reading the same data from local memory.

Some memory bandwidth is inevitable. A typical processing system must read each input image frame from memory via a bus, and write each output image frame to an memory via a bus. For High Definition (HD) video, a frame may be 1920 pixels wide and 1080 pixels high. With a typical 420 chrominance subsampling mode, the size of the frame is approximately 3.1 megabytes (MB). For an input frame rate of 24 frames per second (fps) the input data bandwidth alone is approximately 74 MB/sec.

The output video size and frame rate may differ from the input video size and frame rate, depending on the processing being applied. One possible processing algorithm is a high definition motion compensated frame rate converter, which may read input frames at 24 fps, and write output frames at, for example, 120 fps. In this case the output data bandwidth is in excess of 300 MB/sec, in addition to the input data bandwidth of 74 MB/sec described previously. This much data transfer is largely unavoidable.

An example frame rate conversion algorithm operates in two main phases. First, motion estimation computes a vector field representing the motion between a pair of consecutive input frames. Secondly, a picture building or interpolation phase constructs a number of output frames using pixels taken from the input frames, and placed in the output frames at positions determined by the motion vectors.

There are various approaches to motion estimation. A common one is to divide a frame into small rectangular blocks, and for each block, to search for a matching area of pixel data in an adjacent input frame. The search process typically requires the evaluation of each of a number of motion vector candidates, and the quality of the match is determined using a metric such as the sum of absolute differences (SAD) between the pixels in the block and the pixels from the adjacent frame. The positional offset between matching areas of pixels determines the motion vector for that block.

Motion vector candidates may be any vector within a search range. The search range surrounds the block, and its size determines the range of motions that can be detected and tracked. There are often several candidates with similar values, meaning that pixels from the adjacent frame must be read more than once. Therefore, it is appropriate to store the adjacent frame pixel data corresponding to the search range in a local buffer. Once the buffer is filled many vector candidates can be tested without consuming any additional memory bandwidth, however, the memory bandwidth consumption of filling the buffer must be considered.

In the picture building phase of the algorithm, pixel data corresponding to the selected motion vector is projected into its position in the output frame. Several alternative motion estimation results may be projected, with the pixel values in the output frame formed from a composite of each of them. The pixel data used in picture building is also read from the same pixel data buffer that supplies the pixels for motion estimation.

FIG. 1 illustrates one approach to the design of a pixel data buffer. The buffer 100 is shown the same size as the motion estimator's search range 105, and is centred on the block 110 for which motion estimation is taking place. In practice the buffer size may be extended slightly to supply data to other processes, such as the frame rate converter's picture building phase. When motion estimation processing moves to the next block 115, the pixel data buffer discards data corresponding to a column of blocks 120 at one edge of the search range, and reads data corresponding to a column of blocks 125 at the opposite edge of the search range. If the height of the search range is V blocks, then V blocks of pixel data must be read for each new block that is processed in the motion estimator. Some saving is made as the search range begins to overlap the edge of the screen, but this is roughly offset by the need to read a long row of blocks 130 as the processing position steps down to the next row. A boustrophedon processing order 135 is preferred over a raster scanning order 140, as for processing to jump back to the opposite end of the next row would require a costly replacement of the entire buffer contents 145.

It is reasonable to expect that for motion estimation of a frame, every block of pixel data in the adjacent frame must be examined at least once. Most motion is approximately translational, and the vector field is relatively uniform. While there are exceptions where significant parts of the adjacent frame are never visited by the motion estimator, this cannot ever be relied upon to be the case. It can reasonably be said that a motion estimator is optimal in terms of memory bandwidth if each block of pixel data from the adjacent frame is read once, and once only.

The design of FIG. 1 has the advantage of minimising the amount of storage required for the pixel data buffer, at the expense of approximately V times the memory bandwidth consumption of an optimal design. For a reasonable vertical motion search range, V is not particularly small.

FIG. 2 illustrates a pixel data buffer 200 that is the full width of the frame. The motion estimator's search range 205 corresponds to the block being processed 210. When motion estimation advances to the next block 215, one additional block 220 must be read, and one block 225 may be discarded. The read block position wraps to the beginning of the next row as the processing position approaches the end of the current row, making the distinction between boustrophedon and raster scanning processing orders is less significant. This design achieves the optimal memory bandwidth because each block of the frame need be read only once. Where the frame is wide there may be a greater delay before the buffer is sufficiently full that the first block can be processed. The most significant disadvantage of this design is the considerably larger amount of local memory required for the pixel data buffer.

A memory cache is not normally a suitable alternative to the pixel data buffer in this type of application, due to the time taken to retrieve data from memory via a bus in the event of a cache miss. In contrast, the pixel data buffer designs guarantee that data is available immediately. This is significant in a computationally intensive real-time application such as video processing.

As video frame sizes increase, the amount of storage required for the pixel data buffer increases proportionally. A high-definition (HD) image is 1920 by 1080 pixels. While there is no limit on the size of the motion in a video sequence, there are often practical constraints on the size of a motion estimator's search range. The vertical size of the search range, V, is of particular importance. For a motion estimator to track the majority of movements in HD video, the buffer may need to be several hundred pixels tall. If the pixel data buffer is the width of the screen and if the vertical search range, V, is 200 pixels, then storage for approximately 1920 by 200 pixels is required. (FIG. 2 shows that the buffer may be one block shorter, over part of its width). Motion estimation often operates between different frames, or over different intervals simultaneously, requiring pixel data for perhaps two, three, or four frames at the same time. The storage requirements must therefore be scaled up accordingly. The total amount of storage required is large, and pixel data buffering represents a significant proportion of the silicon area of a motion estimation device.

Ultra High Definition Television (UHDTV) standards define new video formats with higher resolution than HD. 4K UHDTV is a format with frames twice the size of HD in each dimension, i.e. 3840 by 2160 pixels. The need to read the frames remains unavoidable, and so the memory bandwidth increases at least in proportion to the area of the frames, i.e. four times. Consequently, it is desirable to design the pixel data buffering to be as close to optimal as possible, adding no unnecessary memory bandwidth. This suggests the use of a pixel data buffer the full width of the screen. Typical motion vectors also scale in proportion to the frame size, so the search range dimensions will double. The full width pixel data buffer will therefore now be approximately 3840 by 400 pixels, four times the size, and therefore roughly four times the silicon area of the HD solution.

8K UHDTV frames are twice the size of 4K UHDTV in each dimension. This increases the bandwidth requirement to sixteen times that of HD video, and requires sixteen times the amount of pixel data buffer storage.

SUMMARY

The applicant has appreciated that it would be desirable to reduce the amount of memory space required by image data buffers, while also reducing memory bandwidth consumption.

There is provided a method for providing image data to an image processing module, comprising the steps of: reading image data from memory into a down-scaler which down scales the image data to a first resolution; storing the first resolution image data in a first buffer; predicting a region of image data which the image processing module will request; storing image data corresponding to at least part of the predicted region of image data from memory into a second buffer, wherein the image data in the second buffer is at a higher resolution than the first resolution; receiving a request for image data from the image processing module; determining that image data corresponding to at least a portion of the requested image data is not in the second buffer; up-scaling image data from the first buffer to provide a substitute for the at least a portion of the requested image data at a resolution that at least matches the higher resolution; and providing the up-scaled image data to the image processing module.

Some implementations have an advantage that the amount of image data stored at the higher resolution in the second buffer can be small, without the risk that if image data corresponding to the requested image data is not in the second buffer image data will need to be fetched from memory, which can result in, for many applications, an unacceptable delay. If image data corresponding to requested image data is not in the second buffer, then image data from the first buffer is up-scaled to provide a substitute for the requested image data at a resolution that at least matches the higher resolution. This method has the disadvantage that, in some instances, lower quality image data may be provided to the image processing module. High frequency information is lost during the down-scaling process which can not be retrieved by subsequently up-scaling the image data. However, this method has the advantage that the memory space required by image data buffers can be reduced.

Even though image data for a region of the image may be stored in both the second and first buffers, since the second buffer (storing the higher resolution image data) can be small (because of the fall back of having the lower resolution image data in the first buffer), the total memory space required for both of the buffers can be less than that required if all of the image data stored in the first buffer were stored at the higher resolution.

This also means therefore that image data for a larger region of the image can be stored in the same amount of buffer memory. This has the advantage that, in some applications, memory bandwidth required to re-read image data which is not in a buffer can be reduced without increasing the amount of memory space required by the buffer.

In an implementation, the first buffer stores image data corresponding to the full width of an image frame.

Preferably, the image data in the second buffer is read into the second buffer from memory. However, in an alternative embodiment the step of storing image data corresponding to at least part of the predicted region of image data from memory into the second buffer comprises: reading image data from memory into a down-scaler which down-scales the image data to a second resolution; and storing the second resolution image data in the second buffer.

An embodiment of the invention further includes determining that image data corresponding to a portion of the requested image data is in the second buffer; and providing image data from the second buffer to the image processing module at a resolution at least equal to the higher resolution.

Image data may be arranged in each of the first and second buffers in rectangular blocks. Preferably, the size of the blocks in the first buffer is related to the size of the blocks in the second buffer by a scale factor corresponding to the difference between the first resolution and the higher resolution.

The second buffer may be implemented using a content addressable memory.

The region of image data which the image processing module will request may be predicted using data supplied by the image processing module or a further image processing module. For example, the region of image data which the image processing module will request may be predicted using motion vectors supplied by the image processing module or the further image processing module.

In an implementation, the first resolution image data is stored in the first buffer by: writing the first resolution image data to memory; and reading the first resolution image data from memory into the first buffer. Writing the first resolution image data to memory uses memory bandwidth. However, the applicant has appreciated that for applications where otherwise the image data would need to be re-read and down-scaled, writing the first resolution image data to memory may result in an overall memory bandwidth saving. The amount of memory bandwidth required to write and read the first resolution image data to and from memory may be less than the memory bandwidth required to read the image data at a higher resolution, and this saving will be increased if the image data needs to be read from memory multiple times. Further, this method enables the processing power required to down-scale image data to be reduced, since image data only needs to be down-scaled once.

In some aspects, the down-scaler produces residual image data by determining a difference between: image data at the higher resolution; and image data which has been up-scaled from the first resolution to the higher resolution.

In this embodiment, the image data corresponding to the at least part of the predicted region of image data in the second buffer may comprise residual image data. The residual image data has the same resolution as the higher resolution. However, the advantage of using residual image data is that residual image data can often be more easily and fully compressed than the higher resolution image data. This means that advantageously the memory bandwidth required to read and write the residual image data to and from memory may be less than the memory bandwidth required to read the higher resolution image data. Further, the memory space required by the second buffer may be reduced. The residual image data may be compressed using lossy or non-lossy compression.

In this embodiment, providing image data from the second buffer to the image processing module may comprise: up-scaling image data from the first buffer to at least match the higher resolution; combining residual image data from the second buffer with the up-scaled image data; and providing the result to the image processing module.

In some aspects, the method comprises determining the amount of high frequency information in a part of the image. This may be done by analysing the residual image data.

Image data corresponding to part of the predicted region of image data may not be stored into the second buffer, if it is determined that the amount of high frequency information in that part of the image is below a threshold. This enables memory bandwidth to be saved, and in addition frees up space in the second buffer for occupation by other data. This other data may be data that is yet to be stored, or thinking of the second buffer like a cache data which has already been stored (which might be useful in the future) which we can avoid evicting.

Image data corresponding to part of the predicted region of image data may also not be stored into the second buffer, if it is indicated that that part of the predicted region of image data will not be used by the image processing module. This may be the case, for example, if confidence in the predicted image data is low.

In a further preferred embodiment of the present invention, how much image data is stored from memory into the second buffer is determined in view of a memory bandwidth consumption rate requirement.

Preferably, the threshold is adjusted in view of the amount of high frequency information in different parts of the image and the memory bandwidth consumption rate requirement.

In a further aspect, first resolution image data may be provided from the first buffer to the image processing module or a further image processing module in response to a request from the image processing module or the further image processing module for image data at the first resolution. For example, the image processing module or the further image processing module may comprise a motion estimator which uses the image data at the first resolution.

The image processing module may be for example a picture builder of a frame rate convertor which outputs an image at at least the higher resolution based on the results of the motion estimator. In one embodiment, the picture builder of the frame rate convertor further comprises an analyser, which is provided with image data at the first resolution from the first buffer.

In a further aspect, a location of a potential discontinuity between the up-scaled image data from the first buffer and image data provided from the second buffer is identified. A blending unit combines image data from the second buffer with up-scaled image data from the first buffer at the vicinity of the discontinuity in order to reduce the visibility of the discontinuity.

In a further aspect, at least some chrominance image data corresponding to the at least part of the predicted region of image data is not stored into the second buffer. The applicant has appreciated that high frequency information is, in general, not as easily perceived in chrominance image data as in luminance image data. Therefore, not reading chrominance image data for one or more image pixels into the second buffer enables memory bandwidth to be conserved, whilst reducing any decrease in the quality of image data provided to the image processing module. It further enables space in the second buffer to be freed up for occupation by other data.

In some implementations, there is also provided a system for providing image data to an image processing module, comprising: a down-scaler configured to down-scale image data from memory to a first resolution; a first buffer arranged to store the first resolution image data; a second buffer arranged to store image data corresponding to at least part of a predicted region of image data, wherein the image data in the second buffer is at a higher resolution than the first resolution; and a processor configured to: read image data from memory into the down-scaler and store the first resolution image data in the first buffer; predict a region of image data which the image processing module will request; store image data corresponding to at least part of the predicted region of image data from memory into the second buffer; receive a request for image data from the image processing module; determine that image data corresponding to at least a portion of the requested region of image data is not stored in the second buffer; up-scale image data from the first buffer using an up-scaler to provide a substitute for the at least a portion of the requested region of image data at a resolution that at least matches the higher resolution; and provide the up-scaled image data to the image processing module.

Thus, in some implementations, the second buffer may operate a little like a cache, storing a number of blocks of pixel data at high resolution. The contents of the second (high resolution) buffer may be maintained by a buffer controller which may use prediction and rate control algorithms to provide the pixel data required by an image processing module, while also regulating the consumption of memory bandwidth.

Applications (such as the motion estimator and picture builder of a frame rate converter) may access data from either the first or second buffers. A motion estimator, for example, may be designed to operate entirely from low (first) resolution data from the first buffer. The picture builder should preferably operate with high resolution data, in order that the output frames maintain, wherever possible, the resolution of the input frames. Access to the second (high resolution) buffer is through the buffer controller, which supplies high resolution data where it is available in the high resolution buffer, and which supplies up-scaled data from the first (low resolution) buffer when high resolution data is not available.

Further features and advantages of implementations of the disclosure will become apparent from the following detailed description.

BRIEF DESCRIPTION OF THE DRAWINGS

Example embodiments will now be described by way of example only with reference to the accompanying drawings in which:

FIG. 1 illustrates a pixel data buffer which is the same size as a motion estimator's search range;

FIG. 2 illustrates a pixel data buffer which is as wide as the video frame;

FIG. 3 is a block diagram showing the architecture of a system with high and low resolution buffers under the control of a buffer controller in an embodiment of the present invention;

FIG. 4 is a block diagram of an enhanced system that stores low resolution frames and residual data in an embodiment of the present invention;

FIG. 5 is a block diagram of a buffer control unit in an embodiment of the present invention;

FIG. 6 is a block diagram of an alternate buffer control unit that manages the buffering of residual data in an embodiment of the present invention;

FIG. 7 illustrates various alignments of requested data with respect to buffer storage blocks;

FIG. 8 illustrates the availability and non-availability of data in blocks requested from a buffer;

FIG. 9 shows a variation of the buffer control unit incorporating a blending unit in an embodiment of the present invention; and FIG. 10 is a block diagram of a system with an additional buffer storing data of an intermediate resolution in an embodiment of the present invention.

DETAILED DESCRIPTION

The pixel buffering technique described here decouples on-chip memory size from input frame size while limiting memory bandwidth consumption.

This architecture provides a useful and flexible compromise between two extremes. The system of FIG. 1 uses a small on-chip buffer memory, but the memory bandwidth is excessive. The system of FIG. 2, with a full width, high resolution pixel buffer minimises memory bandwidth at the cost of a prohibitively large amount of on-chip buffer memory. While either solution is feasible when video resolutions are low, the deficiencies of both become apparent as resolutions rise. By selection of appropriate scale factors and buffer sizes, the described technique allows an appropriate balance of cost, bandwidth, and image quality to be found. While primarily intended for high resolution video processing systems, the described examples may equally be applied to lower resolution systems where further savings may be made over existing designs.

The examples below are described in the context of a motion compensated frame rate converter. However, the skilled person will appreciate that the technique can be applied to a wide variety of image and video processing applications.

The term "application" is used here to describe a processing block or module that uses buffered pixel data. Applications are typically implemented as part of the same hardware device as the pixel buffering system and should not be confused with, for example, software applications running on a general purpose computer. The motion compensated frame rate converter is one example of an application that uses buffered pixel data, and it will be seen that this application can also be implemented as several applications, each using pixel data in a different way.

FIG. 3 shows a simplified block diagram of a system in which high resolution video frames are stored in a memory 300. A down-scale unit 305 converts the high resolution frames to a lower resolution, and stores the low resolution pixel data in the low resolution buffer 310. To minimise memory bandwidth consumption a buffer the full width of the down-scaled image is preferred.

The down-scale process may use any one of the well-known techniques for image scaling. A reasonably high quality scaler, such as a bicubic type, is recommended, as pixels from the low resolution buffer may appear in the output image.

For some applications, the resolution of the down-scaled data is entirely sufficient. Such an application is shown as low resolution application 315. In the example of a frame rate converter it may be possible to run motion estimators as low resolution applications, as discussed below.

A buffer control unit 320 provides high resolution image data to a high resolution application 335. The high resolution application operates as if it has access to a full sized pixel data buffer containing high resolution pixel data, such as the one shown in FIG. 2. In fact, no such buffer exists. The buffer control unit 320 maintains a small amount of high resolution data in high resolution buffer 330. When application 335 requests pixel data, the buffer control unit supplies it from high resolution buffer 330 if it is available. If the data is not available from the high resolution buffer the buffer control unit supplies data from low resolution buffer 310, via up-scaler 325. The up-scaler ratio matches the ratio of the down-scaler 305, such that the scale of the low resolution data matches that of the high resolution frames. The high resolution application 335 need not know whether any particular pixel has been supplied through the low resolution path. High frequency information is, of course, lost during the down-scale process. When the up-scaled data is used to construct an output the lack of high frequency information may lead to visible softening of the image.

Buffer control unit 320 ensures that, wherever possible, the data requested by the high resolution application 335 is present in high resolution buffer 330.

In one example, pixel data storage in the high resolution buffer 330 is organised in rectangular blocks. The size of these storage blocks may be chosen for the best performance of the buffering system, and may differ from the block size, if any, used for processing by high resolution application 335. Division of the high resolution storage into blocks allows the management of the buffer contents at a convenient granularity, and for the request of regions of up-scaled data from the up-scaler 325 and low resolution buffer 310.

Similarly, low resolution buffer 310 may store pixel data in rectangular blocks. It may be particularly convenient, for example, to select a low resolution storage block size that is related to the high resolution storage block size by the scale factor used in the down-scaler 305 and up-scaler 325. In this way, one low resolution block corresponds to one high resolution block.

Memory caches are well known. A conventional memory cache receives requests for data from a particular memory address, and supplies that data to the device that made the request. The first time a piece of data is requested, it is fetched from memory via a bus. The data is duplicated in the cache, so that if requested a second time, the data can be supplied from the cache, rather than being fetched again from memory. This is known as a 'cache hit'. The amount of storage in a cache is relatively small, so it is not generally possible for the cache to hold a duplicate copy of the entire working set of data. This is particularly true when the working set is large, as is the case with image or video data. Typically, a new piece of data being loaded into the cache will evict another piece of data. Should the evicted piece of data be requested again, it will need to be re-fetched from memory. The situation where a read request results in data being fetched from memory is known as a 'cache miss'. The cache's size, mapping rules and replacement policy determine the behaviour of the cache, and can be selected for general purpose performance, or for performance in a particular application.

Pre-fetching is a technique used with caches when it is possible to predict that a piece of data will be requested from the cache in the near future. The pre-fetch transfers the data into the cache, such that a cache hit will occur when it is first requested. This may be appropriate in a video application, if, for example, blocks of pixels are being processed in a raster scan order. Shortly before processing of one block is complete, a pre-fetch instruction can be issued to fetch the data for the next block into the cache, such that the data for the next block is available immediately that the processing of the next block starts. Pre-fetching does not reduce bandwidth consumption, but does help to hide the latency (delay) associated with a cache miss. When pre-fetching is used, the possibility should be considered that the pre-fetched data will evict other data from the cache while it is still in use, causing additional cache misses.

The high resolution buffer 330 and controller 320 differ from a conventional cache in that a request for data that is not present in the high resolution buffer does not result in that data being fetched from memory. Instead, the data is provided from the low resolution buffer 310, via up-scaler 325. In this way, the latency of a memory access is always avoided.

Without a means such as the 'cache miss' to populate the high resolution buffer 330, some other mechanism must be provided. The buffer controller 320 performs this function in parallel with the provision of data to application 335.

The structure of a buffer control unit 320 is shown in FIG. 5. The read controller 500 receives a request for a block of image data from an application. The request is processed to determine the data required from the high resolution buffer 505, for example, by mapping the request onto the high resolution storage block size. The high resolution buffer is then queried to determine whether the buffer contains the data requested. The mechanism for querying the buffer may use techniques similar to those used in cache design: For example, a tag 510 is stored with each block of buffered data 515, and may be derived from the coordinates of the pixel data in the frame, or from the address of the data in memory. The buffer may then be implemented as a content addressable memory (CAM) which allows the data corresponding to a particular tag to be retrieved.

When the requested data is contained in the high resolution buffer, data is supplied via path 520 to multiplexer 525. If the requested data is not contained in the high resolution buffer a request is sent to the up-scaler (and from the up-scaler to the low resolution buffer) to supply up-scaled low resolution data via path 530. Alternatively, the request for data may be sent to high resolution buffer and up-scaler simultaneously, such that a greater part of the latency involved in upscaling low resolution data is hidden behind the time taken for the query of the high resolution buffer.

Optionally, the request for data may be sent to memory via a bus, and high resolution supplied to the multiplexer via path 535. Generally, the system supplies data through either low resolution or high resolution buffer paths to avoid the considerable latency and bandwidth consumption associated with an access to memory. Nevertheless, the option to supply data from memory may be useful in some applications.

Multiplexer 525 switches between the various data paths, under the control of read controller 500, so as to supply to appropriate data to the application, at output 540.

Pre-fetch controller 545 is responsible for reading data from memory and for storing it in the high resolution buffer. Ideally, all data will have been fetched and be available in the high resolution buffer before it is requested by an application. In practice, the availability of data will depend on the predictability of demand, the storage policy in the high resolution buffer (i.e. whether storing one piece of data causes the eviction of another), and other factors such as rate control applied to the memory interface. In general the pre-fetch control algorithm will depend upon the characteristics of the application.

The picture building phase of the frame rate converter is likely to run as a high resolution application. Motion vectors determined during a motion estimation phase are used to identify the locations in an input frame from which pixel data must be retrieved. The retrieved pixel data is then composited, possibly with other pixel data retrieved from other input frames, into an output frame for display.

Pre-fetch control for the picture building application is straightforward, if a motion estimation application runs sufficiently far in advance that motion vectors allow the exact data requirements of the picture builder to be known. In this case the pre-fetch control may comprise a FIFO (first in, first out) queue of the anticipated data requests, with data being supplied to the high resolution buffer just before it is requested by the picture builder.

If actual motion vectors are not available sufficiently far in advance, the pre-fetch controller may attempt to determine the requests that the picture builder is likely to make.

One example method of prediction is to assume that motion will be the same as it was at the same location during a previous frame interval. Moving objects usually continue to move, so this normally results in good prediction. An exception is at the edges of moving objects, where the vector corresponds to the motion of an object which has moved away. Motion compensation of the vector field may improve the prediction in these cases.

In many cases the dominant motion in a frame is due to motion of the camera, for example in the case of a horizontal pan. The vector representing this motion is known as a global motion vector, and may be derived from an average value of a vector field. Even where the scene contains moving objects, an average computed using a median produces a global motion vector which is often a good prediction for the motion vector in a majority of the blocks in a frame. A global motion vector therefore provides an alternative prediction which is suitable for use by the pre-fetch controller.

When using vectors from a previous frame interval, either individually, or as a global motion, the accuracy of the prediction relies upon motion that does not change significantly from one frame interval to the next. Fortunately, this is generally the case. As motion estimation proceeds in the current frame interval, those vectors may also be incorporated in the prediction, allowing small changes in motion to be accommodated.

When prediction fails the requested pixel data will not be available in the high resolution buffer, and so low resolution pixel data will be supplied instead. Prediction is most likely to fail where there are moving objects, or sudden changes in motion. Motion blur may soften the appearance of moving objects, and viewers are less able to track objects that move erratically. The supply of low resolution pixel data is therefore likely to coincide with areas of the image in which the high resolution content is either absent or not easily perceived. As a result, the visual impact of prediction failure is reduced.

In an ideal case, where prediction works well, the memory bandwidth consumption due to the supply of high resolution pixel data might be expected to approach the optimum case, where every pixel (or block of pixels) is read once. In practice, the blocks of pixels requested by the high resolution application are unlikely to be aligned with the storage block grid used in the high resolution buffer.

FIG. 7a shows common cases of a misaligned data requests. When block 700 is requested, pixels from four storage blocks 711, 712, 713, and 714 must be output. If the high resolution application processes blocks in a raster scan order, the caching effect of the high resolution buffer can reduce the memory bandwidth consumption from 4× to 2×. For example, when block 720 is requested, storage blocks 713 and 714 remain in the buffer from the previous access, and two additional blocks, 731 and 732 are required.

If resources permit, a larger high resolution buffer may allow blocks loaded during the processing of one row to remain available for reuse as the next row is being processed. For example, when block 740 is requested, storage blocks 712 and 714 remain in the buffer, and additional blocks 751 and 752 are required. When block 760 is then requested, blocks 714, 732, and 752 remain in the buffer, and one additional block, 753 is required. In this case, memory bandwidth consumption may approach 1×.

Alternatively, improvements in caching performance may be obtained without great increase in buffer size, by changing the block processing order from raster scan to a tiled layout, or a Morton order layout, if the application permits.

In a motion compensated system, block requests will be arranged in a packed grid (such as blocks 700, 720, 740, and 760) when the vector field is uniform. If the vector field is not uniform this may give rise to a sequence of block requests such as 740, 760, 780. While this sequence may be entirely predictable (given prior knowledge of the vector field), it is also likely to upset the caching performance of the buffer. For example, while storage blocks 732 and 792 may remain in the buffer, it is likely that blocks 731 and 791 have been discarded.

A motion estimator is a process which is well suited to operate as a low resolution application. Signal conditioning is a well-known technique to improve the performance of a motion estimator, and often includes low-pass filtering of the image data. The reasons that this is beneficial include noise reduction, and over-sensitivity of block matching measures such as the sum of absolute differences (SAD) to very high frequency detail. Consequently there is normally very little disadvantage, and probably some advantage, to running a motion estimator on data that has been down-scaled to a lower resolution.

Despite this, a motion estimator makes accesses to data that are reasonably predictable, and the degree of locality is such that the high resolution buffer can perform well if the choice is made to implement a motion estimator as a high resolution process.

In the motion estimator, the comparison of blocks of pixel data is typically the comparison of one grid-aligned block of pixels in one frame, with several non-candidate aligned candidate blocks in an adjacent frame. A number of non-aligned blocks are illustrated in FIG. 7b. Selection of the candidate block positions is a complicated topic that will not be discussed here, but which will be familiar to those skilled in the art. It is, essentially, a problem of predicting the motion of objects. The set of candidate block positions will typically cluster around one or more likely motion vectors, with small variations in position that allow the motion vector field to improve and adapt over time. Clusters 777 and 778 are shown, with four and two candidates respectively. It can be seen that the buffer performs well, since several candidate locations require data from the same set of pixel data storage blocks.

To the extent that candidate block positions can be predicted sufficiently far in advance, they provide useful input to the pre-fetch controller 545, since each candidate block position represents an area of pixel data that will be requested as the candidates are tested. The pre-fetch controller takes input from the application, via data path 550, which may include data of this type.

FIG. 4 is a block diagram showing additional details that may be implemented in a further example system.

In many applications each frame of a video is processed several times. In the example of a motion estimator, a search takes place between a pair of frames. The first motion estimation takes place between frame 0 and frame 1. The second motion estimation takes place between frame 1 and frame 2, the third motion estimation between frame 2 and frame 3, and so on. With the exception of the first frame in the sequence, each frame is required by two motion estimations. More sophisticated motion estimators may perform searches over different intervals, and in different directions (e.g. searching for the contents of frame n in frame n−1 is not the same as searching for the contents of frame n−1 in frame n). As a result, it is possible that each frame of video will be read two, three, or more times. Since it is not normally feasible to store entire frames in buffer storage, memory bandwidth increases accordingly.

In an alternative embodiment, memory 400 contains storage for high resolution video frames 405, which are processed by a down-scaler 410. Low resolution buffer control 415 stores the down-scaled pixel data in the low resolution buffer, as before, and also returns the data to memory 420. When the same frame is processed for a second time, the low resolution buffer controller retrieves the low resolution frames 420 from memory, avoiding the need to down-scale the high resolution frame again.

If the size in memory of a high resolution frame is B, and a typical down-scale factor of 0.5 is used, then the size of the low resolution frame in memory is B/4. The first time a frame is processed, the memory bandwidth consumption is a read of B, plus a write of B/4. The second time the frame is processed the memory bandwidth consumption is a read of B/4. The total memory bandwidth consumption, for a frame processed n times, is (1+n/4) B, compared to nB for a system that does not store the down-scaled frames. There is therefore a bandwidth saving for any frame that is accessed more than once. Since the down-scaler 410 has to process fewer frames, there is also an opportunity to save silicon area or to reduce power consumption.

Down-scaler 410 may also produce a residual output. The residual is the difference between the high resolution pixel data, and the pixel data that will eventually be recreated when the low resolution pixel data is up-scaled. Residual data has the same resolution as the high resolution pixel data, but has the advantage of being relatively easy to compress. Residual encoder 425 compresses the residual data and stores it in memory at 430.

Buffer control unit 435 now maintains a buffer of encoded residual data 440, rather than the buffer of high resolution pixel data 330. When the high resolution application requests pixel data and the appropriate piece of residual data is available in residual buffer 440, the residual is decoded at 445, and added to the up-scaled low resolution data. This is equivalent to providing the high resolution data directly.

The compressibility of the residual data varies, between very little, in areas of considerable high frequency detail, to considerable, in areas where the high resolution frame has very little high frequency detail. In the worst case, the size of the residual data that must be fetched from memory is the same as if high resolution pixel data was being supplied. On average, the residual data is smaller, reducing the memory bandwidth further. Furthermore, compressed residual data occupies less space in residual buffer 440, increasing the effective size of the buffer, and meaning that there are fewer occasions when the buffer controller 435 will have to supply low resolution pixel data to the application.

FIG. 6 shows the buffer control unit of FIG. 5 modified to work in the system of FIG. 4. The high resolution pixel data buffer is replaced with a residual buffer 600, and the residual decoder 605 corresponds to block 445 of FIG. 4. Decoded residual data is summed with low resolution data at 610 to provide high resolution pixel data to the multiplexer. If an unbuffered residual data path, 615, is used, then this data must be routed to the residual decoder.

Residual data may be stored in blocks, preferably the same size as the storage block size used by the high resolution buffer. Various methods may be appropriate for compression of the residual data, and such methods are well known from the fields of image and video encoding. Methods based on the discrete cosine transform (DCT), or on wavelets, are appropriate. With such methods it also becomes possible to consider lossy encoding of the residual data. Lossy encoding is used, for example, in JPEG image encoding, or in MPEG video encoding.

In the system described here, lossy encoding of residuals may further reduce memory bandwidth, and may permit an even greater number of residuals to be stored in the high resolution buffer than is possible with lossless residual encoding. The possible disadvantage is that the reconstruction of high resolution pixel data, from the up-scaled low resolution image and the residual, is no longer perfect. In many cases the degree of loss may be visually imperceptible, and in most cases, the reconstructed high resolution data will be preferred over the use of the up-scaled low resolution data, which itself represents a considerable degree of loss of information. Whether to use lossy residual compression, and the degree of compression used, will depend on the application.

Computing a residual also provides an opportunity to analyse the contents of the high resolution image. There are considerable benefits in performing this analysis, even in the system of FIG. 3 where the residual is not stored. If the residual of a block is small then there is little high frequency content in that part of the image. Knowledge of the distribution of high frequency detail in an image can be used by the buffer controller 320 to optimise buffer use and bandwidth consumption.

Where the residual for a block is sufficiently small that it can be determined that there will be no significant visual difference between high resolution and low resolution pixel data, the buffer controller may choose not to load high resolution data from memory, even when it is predicted that that data will be requested by a high resolution application. The absence of the data in the high resolution buffer will result in low resolution data being supplied instead, and a saving in bandwidth consumption will be achieved.

A similar benefit may be gained with information supplied by the applications. FIGS. 5 and 6 both show inputs 550 and 620 which provide application data to the pre-fetch controller. The application data may include motion vector and global motion vector data as described previously, but may also include further data, for instance, about the performance of the algorithms.

In the frame rate converter example, the picture builder may analyse motion vector and pixel data as it constructs the composite image. Several situations may occur where the picture builder can supply application data that allows the pre-fetch controller to optimise bandwidth consumption.

As described previously, a typical picture builder creates its composite image using pixel data projected from several input frames, according to several different motion vector fields. The job of the picture builder is to resolve disagreements between the different projections in order to produce the best possible composite output. The output will typically be a weighted blend between some or all of the projections at any particular position in the image.

In one example the picture builder is split into two parts; an analysis stage, and a composition stage. The analysis stage now runs as a low resolution application, and the composition stage as a high resolution application.

Where the analysis stage determines that all, or a majority, of projections are consistent with each other, a blend is unnecessary, and any one of the consistent projections is sufficiently good to be used alone in the output image. In this case, the analysis stage can send application data to the pre-fetch controller indicating that only one of the projected images is required by the composition stage. The high resolution data corresponding to this projection will be fetched into the high resolution buffer, but data for other projections will not.

Where the degree of confidence in the correctness of the composite image is low various types of error concealment are used. One particular type of error concealment is to apply a low pass filter, or blur, to the output image. It is recognised that there is little point in reading high resolution data if the resolution is to be degraded by filtering. Therefore, the use of error concealment may be indicated by sending application data to the buffer controller. The buffer controller will avoid reading the high resolution data, resulting in a reduction in bandwidth consumption.

Similar savings may be made at any time that it can be determined that only a subset of projected images are required by the composition stage.

It will be clear that the above described examples are relevant to applications other than frame rate conversion, and that many algorithms will be able to supply application data that allows the pre-fetch controller to optimise memory bandwidth consumption in an appropriate way.

The examples above describe situations where the buffer controller avoids fetching certain blocks of high resolution data, based on information that indicates that the low resolution data will be sufficient. There may be other cases where high resolution data would be desirable, but for some reason is not available. Reasons may include insufficient space in the high resolution buffer, inaccurate prediction by the application or pre-fetch controller, or insufficient available memory bandwidth to supply the high resolution data.

In the latter case, the system may impose a limit on the amount of memory bandwidth consumed. In the description of FIG. 7, and the discussion of non-aligned data requests, it was said that memory bandwidth consumption may vary between 1× and 4× the amount of requested data, depending on the alignment of the requests, and the caching performance of the buffer.

In one example, rate control may be applied to the high resolution data pre-fetch. For example, a system that would typically consume memory bandwidth of 2.2× the amount of requested data might be restricted to consume only 1.5×. The bandwidth restriction is applied by avoiding reading certain blocks of high resolution data, and instead supplying low resolution data to the applications instead.

Rate control algorithms are used in video coding where there is often a requirement to produce an encoded bit stream at a desired data rate. A video encoder controls the data rate by varying the degree of quantization used for each encoded block. In the system of FIG. 3, where high resolution data is read from memory, the rate controller may either read, or not read, the data for each block. In the system of FIG. 4, provided that residual data is encoded appropriately, the rate controller may choose to read all, some, or none of the residual for each block. This may allow a more sophisticated rate control than is possible in the system of FIG. 3.

A typical rate control algorithm will achieve the target rate in the long term, while often allowing short term fluctuations above the target rate. In a frame based system, such as video processing, it is desirable to distribute the available bandwidth appropriately across the frame. The rate control should not waste bandwidth supplying high resolution data to the top part of a frame if this means that the lower part of the frame is starved of data. On the other hand, bandwidth should not be reserved excessively in anticipation of high resolution detail that does not exist. Analysis of the distribution of detail in the frame, such as has been described in conjunction with the computation of a residual, provides data that a rate controller can use to allocate bandwidth appropriately. Where application data also allows the pre-fetch controller to avoid reading high resolution data for some parts of the image, the application data may also be supplied to the rate controller and incorporated into the rate control calculations.

FIG. 7 has already been described, and the effects of the alignment of data requests on bandwidth have been discussed. Another issue that arises when high resolution data is not available from the high resolution buffer is the possibility of a visible discontinuity in the output image where a transition between high resolution and low resolution data occurs.

FIG. 8a shows a situation in which high resolution data is not fully available. Storage blocks shown shaded, such as 800, are blocks for which high resolution data is available, and blocks without shading, such as 805, are blocks for which high resolution data is not available. A request for pixel data block 810 can be satisfied entirely from the high resolution buffer. Pixel data block 815, however, requires data from storage block 805, which is not available in the high resolution buffer. The portion 820, at least, of the request must therefore be satisfied using low resolution data.

FIG. 8b shows a request for a further pixel data block 850, occurring some time after the request for block 810. High resolution data for storage block 800, previously available in the buffer, is no longer available, and so portion 855 of the request is satisfied using low resolution data.

When a block such as 815 or 825 is requested, the read controller has the option of providing only low resolution pixel data for the requested block, or, providing those high resolution pixels that are available and providing the remainder from the low resolution buffer. The decision may depend upon the proportion of available high resolution pixels, or their distribution within the block. In the case that a mixture of high and low resolution pixels are supplied the read control unit 500 of FIG. 5 must respond to the partial availability of data in the high resolution buffer and control multiplexer 525 on a per-pixel basis. The similar units shown in FIG. 6 behave similarly.

The approach to resolution discontinuity is highly dependent on the application. It is always known, when data is requested, which pixels can be provided from the high resolution buffer, and which from the low resolution buffer. An application may then take into account data such as residual sizes, or other information obtained during image analysis, in order to determine the likely visibility of any discontinuity. One option is to conceal a discontinuity by the application of a smoothing post-process. This approach may be seen to be similar to de-blocking approaches already known in video decoders such as H.264. Alternatively, the supply of only low resolution data will avoid discontinuities within a block, but not necessarily at their edges. In FIG. 8a, discontinuities at internal edges 825 and 830 are known at the time that the pixel data block 815 is supplied to the application. In FIG. 8b, discontinuities at external edges 860 and 865 can be known only when pixel data is assembled into an output image, for example, in the picture builder application.

An alternative approach applies filtering or blending as the data is provided. FIG. 9 shows a suitable modification to the system of FIG. 5, although it could equally be applied to the system of FIG. 6. A blending unit 910 replaces the multiplexer, and, with suitable control 915 from the read control unit 900, provides a smooth transition between high resolution and low resolution data. The blend control data, rather than providing a per-pixel switch, must now provide a fractional value indicating the proportion of low resolution data to use at each position. Since low resolution data is always available, and high resolution data may not be, the blended region always lies on the high resolution side of the line of discontinuity. The detailed control of the blending unit will depend upon the applications and pre-fetch algorithms used in each particular case, and in particular upon the degree to which the pattern of read requests, and the availability of data in the high resolution buffer can be known in advance.

Video images are often represented using luminance and chrominance data. The luminance data contains a high resolution black and white image, and the chrominance data contains the additional data required to form a colour image. Chrominance data is commonly sub-sampled, such that it is at a lower resolution than the corresponding luminance data. It is known that the perception of detail and sharpness in an image comes primarily from the luminance data and that a considerable amount of information can be removed from the chrominance data before image degradation is easily perceived.

In another example, the buffer controller handles luminance and chrominance data separately. When a decision is made on whether to load data into the high resolution buffer, the prefetch controller may make a different decision for luminance data than it makes for the corresponding chrominance data. This decision may, for example, be based on the amount of high frequency detail in the luminance and chrominance data, on data from an application, or on the requirements of a rate controller. Requests for image data are handled according to whether luminance or chrominance data is available in the high resolution buffer, with any component that is unavailable being supplied from the low resolution buffer via the up-scaler. A system may be set up such that most chrominance data is supplied from the low resolution buffer, saving bandwidth and making more high resolution buffer space for luminance data. Alternatively, a system may supply all chrominance data from the low resolution buffer.

In the above examples, systems have been described in which image data exists at two resolutions. It is clear that the same techniques may be extended to any number of resolutions. For example, a system may add a medium resolution image buffer. FIG. 10 shows a modification of the system of FIG. 3 in which the buffer control unit 1000 manages both a high resolution buffer 1015 and a medium resolution buffer 1010. Scaler 1005 performs both the down-scale from high resolution to medium resolution, and the up-scale from medium resolution to high resolution. The system may choose to buffer image data at a medium resolution where analysis shows that the image content would be unacceptably degraded if low resolution data was used, but where the use of high resolution data would bring little extra benefit. Medium resolution buffer 1010 may be integrated with the high resolution buffer 1015 into a single memory 1020 in which the proportion of storage allocated to data of each resolution may be varied. The storage of medium resolution data rather than high resolution data increases the effective capacity of memory 1020, and increases the buffering performance of the system.

The invention claimed is:

1. A method for providing image data to an image processing module, comprising:
    reading image data from memory into a down-scaler which down scales the image data to a first resolution;
    storing the first resolution image data in a first buffer;
    predicting a region of image data which the image processing module will request;
    storing image data corresponding to at least part of the predicted region of image data from memory into a second buffer, wherein the image data in the second buffer is at a higher resolution than the first resolution;
    receiving a request for image data from the image processing module;
    determining that image data corresponding to at least a portion of the requested image data is not in the second buffer;
    up-scaling image data from the first buffer to provide a substitute for the portion of the requested image data that is not in the second buffer at a resolution that at least matches the higher resolution; and
    providing the up-scaled image data to the image processing module.

2. The method according to claim 1, wherein the step of storing image data corresponding to at least part of the predicted region of image data from memory into the second buffer comprises:
    reading image data from memory into a down-scaler which downscales the image data to a second resolution; and
    storing the second resolution image data in the second buffer.

3. The method according to claim 1, further comprising:
    determining that image data corresponding to a portion of the requested image data is in the second buffer; and
    providing image data from the second buffer to the image processing module at a resolution at least equal to the higher resolution.

4. The method according to claim 1, wherein the first buffer stores image data corresponding to the full width of an image frame.

5. The method according to claim 1, wherein image data is arranged in each of the first and second buffers in rectangular blocks.

6. The method according to claim 5, wherein the size of the blocks in the first buffer is related to the size of the blocks in the second buffer by a scale factor corresponding to the difference between the first resolution and the higher resolution.

7. The method according to claim 1, wherein the second buffer is implemented using a content addressable memory.

8. The method according to claim 1, wherein the region of image data which the image processing module will request is predicted using data supplied by the image processing module or a further image processing module.

9. The method according to claim 8, wherein the region of image data which the image processing module will request is predicted using motion vectors supplied by the image processing module or the further image processing module.

10. The method according to claim 1, wherein storing the first resolution image data in the first buffer comprises: writing the first resolution image data to memory; and reading the first resolution image data from memory into the first buffer.

11. The method according to claim 1, wherein the down-scaler produces residual image data by determining a difference between: image data at the higher resolution; and image data which has been up-scaled from the first resolution to the higher resolution.

12. The method according to claim 11, wherein the residual image data is compressed using lossy or non-lossy compression.

13. The method according to claim 11, wherein the image data corresponding to at least part of the predicted region of image data in the second buffer comprises residual image data.

14. The method according to claim 13, wherein providing image data from the second buffer to the image processing module comprises:
    up-scaling image data from the first buffer to at least match the higher resolution;
    combining residual image data from the second buffer with the upscaled image data; and
    providing the result to the image processing module.

15. The method according to claim 13, further comprising determining the amount of high frequency information in a part of the image.

16. The method according to claim 15, wherein image data corresponding to part of the predicted region of image data is not stored into the second buffer if it is determined that the amount of high frequency information in that part of the image is below a threshold.

17. The method according to claim 13, wherein image data corresponding to part of the predicted region of image data is not stored into the second buffer, if it is indicated that that part of the predicted region of image data will not be used by the image processing module.

18. The method according to claim 13, wherein how much image data is stored from memory into the second buffer is determined in view of a memory bandwidth consumption rate requirement.

19. The method according to claim 18, wherein image data corresponding to part of the predicted region of image data is not stored into the second buffer if it is determined that the amount of high frequency information in that part of the image is below a threshold and the method further comprises adjusting the threshold in view of the amount of high frequency information in different parts of the image and the memory bandwidth consumption rate requirement.

20. The method according to claim 13, further comprising providing first resolution image data from the first buffer to the image processing module or a further image processing module in response to a request from the image processing module or the further image processing module for image data at the first resolution.

21. The method according to claim 20, wherein the image processing module or the further image processing module comprises a motion estimator which uses the image data at the first resolution.

22. The method according to claim 20, wherein the image processing module which is provided with image data at at least the higher resolution outputs an image based on the results of a motion estimator.

23. The method according to claim 13, wherein the image processing module comprises a picture builder of a frame rate convertor.

24. The method according to claim 23, further comprising providing first resolution image data from the first buffer to the image processing module or a further image processing module in response to a request from the image processing module or the further image processing module for image data at the first resolution and wherein the picture builder of the frame rate convertor further comprises an analyser which is provided with image data at the first resolution from the first buffer.

25. The method according to claim 13, wherein a location of a potential discontinuity between the up-scaled image data from the first buffer and image data provided from the second buffer is identified.

26. The method according to claim 25, wherein a blending unit combines image data from the second buffer with up-scaled image data from the first buffer at the vicinity of the discontinuity in order to reduce the visibility of the discontinuity.

27. The method according claim 13, wherein at least some chrominance image data corresponding to the at least part of the predicted region of image data is not stored into the second buffer.

28. A system for providing image data to an image processing module, comprising:
a down-scaler configured to down-scale image data from memory to a first resolution;
a first buffer arranged to store the first resolution image data;
a second buffer arranged to store image data corresponding to at least part of a predicted region of image data, wherein the resolution of the image data stored in the second buffer is higher than the first resolution; and
a processor configured to:
read image data from memory into the down-scaler and store the first resolution image data in the first buffer,
predict a region of image data which the image processing module will request;
store image data corresponding to at least part of the predicted region of image data from memory into the second buffer,
receive a request for image data from the image processing module,
determine that image data corresponding to at least a portion of the requested image data is not in the second buffer,
up-scale image data from the first buffer using an up-scaler to provide a substitute for the at least a portion of the requested region of image data at a resolution that at least matches the higher resolution, and
provide the up-scaled image data to the image processing module.

29. The system according to claim 28, wherein the processor is configured to store image data corresponding to at least part of the predicted region of image data in the second buffer by:
reading image data from memory into a down-scaler which downscales the image data to a second resolution; and
storing the second resolution image data in the second buffer.

30. The system according to claim 28, wherein the processor is further configured to:
determine that image data corresponding to a portion of the requested image data is in the second buffer; and
provide image data from the second buffer to the image processing module at a resolution at least equal to the higher resolution.

31. The system according to claim 28, wherein the first buffer stores image data corresponding to the full width of an image frame.

32. The system according to claim 28, wherein the image data is arranged in each of the first and second buffers in rectangular blocks.

33. The system according to claim 32, wherein the size of the blocks in the first buffer is related to the size of the blocks in the second buffer by a scale factor corresponding to the difference between the first resolution and the higher resolution.

34. The system according to claim 28, wherein the second buffer is implemented using a content addressable memory.

35. The system according to claim 28, wherein the region of image data which the image processing module will request is predicted using data supplied by the image processing module or a further image processing module.

36. The system according to claim 35, wherein the region of image data which the image processing module will request is predicted using motion vectors supplied by the image processing module or the further image processing module.

37. The system according to claim 28, wherein the processor is configured to store the first resolution image data in the first buffer by:
writing the first resolution image data to memory; and
reading the first resolution image data from memory into the first buffer.

38. The system according to claim 28, wherein the down-scaler produces residual image data by determining a difference between: image data at the higher resolution; and image data which has been up-scaled from the first resolution to the higher resolution.

39. The system according to claim 38, wherein the residual image data is compressed using lossy or non-lossy compression.

40. The system according to claim 38, wherein the image data corresponding to at least part of the predicted region of image data stored in the second buffer comprises residual image data.

41. The system according to claim 40, wherein the processor is configured to provide image data from the second buffer to the image processing module by:
- up-scaling image data from the first buffer to at least match the higher resolution using an up-scaler;
- combining residual image data from the second buffer with image data from the first buffer which has been up-scaled to at least match the higher resolution; and providing the result to the image processing module.

42. The system according to claim 28, wherein the processor is further configured to determine the amount of high frequency information in a part of the image.

43. The system according to claim 42, wherein image data corresponding to part of the predicted region of image data is not stored into the second buffer if it is determined that the amount of high frequency information in that part of the image is below a threshold.

44. The system according to claim 28, wherein image data corresponding to at least part of the predicted region of image data is not stored into the second buffer if it is indicated that that part of the predicted region of image data will not be used by the image processing module.

45. The system according to claim 28, wherein how much image data stored from memory into the second buffer is determined in view of a memory bandwidth consumption rate requirement.

46. The system according to claim 45, wherein the threshold is adjusted in view of the amount of high frequency information in different parts of the image and the memory bandwidth consumption rate requirement.

47. The system according to claim 28, wherein the processor is further configured to provide first resolution image data from the first buffer to the image processing module or a further image processing module in response to a request from the image processing module or the further image processing module for image data at the first resolution.

48. The system according to claim 47, wherein the image processing module or the further image processing module which requests image data at the first resolution comprises a motion estimator which uses the image data at the first resolution.

49. The system according to claim 47, wherein the image processing module which requests image data at at least the higher resolution outputs an image based on the results of a motion estimator.

50. The system according to claim 28, wherein the image processing module comprises a picture builder of a frame rate convertor.

51. The system according to claim 50, wherein the processor is further configured to provide first resolution image data from the first buffer to the image processing module or a further image processing module in response to a request from the image processing module or the further image processing module for image data at the first resolution and the picture builder of the frame rate convertor further comprises an analyser which is provided with image data at the first resolution from the first buffer.

52. The system according to claim 28, wherein the processor is further configured to identify a location of a potential discontinuity between the up-scaled image data from the first buffer and image data provided from the second buffer.

53. The system according to claim 52, wherein a blending unit combines image data provided from the second buffer with up-scaled image data from the first buffer at the vicinity of the discontinuity in order to reduce the visibility of the discontinuity.

54. The system according to claim 28, wherein at least some chrominance image data corresponding to the at least part of the predicted region of image data is not stored into the second buffer.

* * * * *